(12) United States Patent
Bhate et al.

(10) Patent No.: US 7,090,459 B2
(45) Date of Patent: Aug. 15, 2006

(54) HYBRID SEAL AND SYSTEM AND METHOD INCORPORATING THE SAME

(75) Inventors: Nitin Bhate, Rexford, NY (US); Raymond Edward Chupp, Glenville, NY (US); Kevin Bruce, Greer, SC (US); Alberto Jose Negroni, Simpsonville, SC (US); Ronald Ralph Cairo, Greer, SC (US)

(73) Assignee: General Electric Company, Niskayuna, NY (US)

( * ) Notice: Subject to any disclaimer, the term of this patent is extended or adjusted under 35 U.S.C. 154(b) by 123 days.

(21) Appl. No.: 10/814,837

(22) Filed: Mar. 31, 2004

(65) Prior Publication Data

US 2005/0220611 A1    Oct. 6, 2005

(51) Int. Cl.
   *F01D 11/00*    (2006.01)

(52) U.S. Cl. .................. 415/1; 415/116; 415/173.3; 415/174.2; 277/644; 277/646; 277/647; 277/581

(58) Field of Classification Search ............ 415/173.1, 415/173.3, 174.2, 228, 116, 1; 277/578, 277/581, 583, 628, 644, 646, 647
See application file for complete search history.

(56) References Cited

U.S. PATENT DOCUMENTS

| 3,300,178 A | * | 1/1967 | Rizk et al. ................... 415/115 |
| 5,014,917 A | * | 5/1991 | Sirocky et al. ......... 239/265.11 |
| 5,044,823 A | * | 9/1991 | Burgess ..................... 405/152 |
| 6,039,325 A | | 3/2000 | Steinetz et al. ............. 277/633 |

OTHER PUBLICATIONS

Patrick H. Dunlap, Jr.; Bruce M. Steinetz; Jeffrey J. DeMange; Shawn C. Taylor; Title: "Toward an Improved Hypersonic Engine Seal"; AIAA-2003-4834; 39th AIAA/ASME/SAE/ASEE Joint Propulsion Conference; Jul. 21-23, 2003; pp. 1-19.

* cited by examiner

*Primary Examiner*—Ninh H. Nguyen
(74) *Attorney, Agent, or Firm*—Fletcher Yoder

(57) ABSTRACT

A seal having a first seal mechanism adapted for insertion between a first structure and a second structure, wherein the first structure is in communication with a first medium and the second structure is in communication with a second medium. The seal also includes a second seal mechanism, which is pressuringly biasable against the first seal mechanism and against the second structure by the second medium. In certain embodiments, a system has a first structure in communication with a first medium and a second structure houses a seal assembly between the first and second structures. The seal assembly includes an interface seal disposed against the first structure and a flexible seal pressuringly biased against the second structure and the interface seal by a second medium.

48 Claims, 7 Drawing Sheets

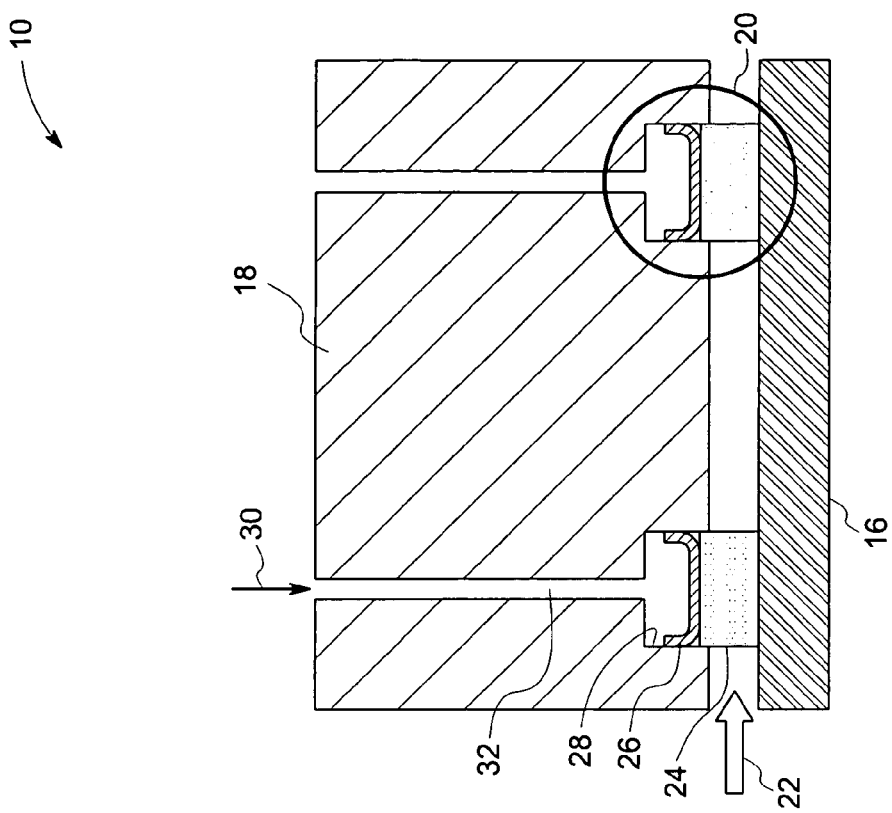
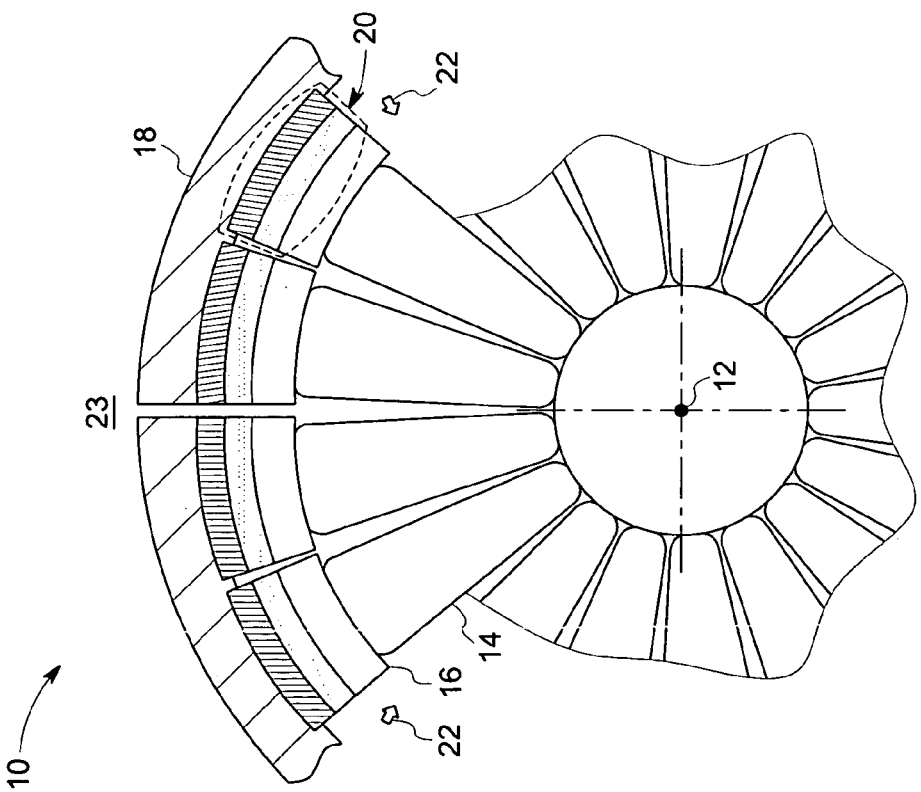
FIG.2
FIG.1

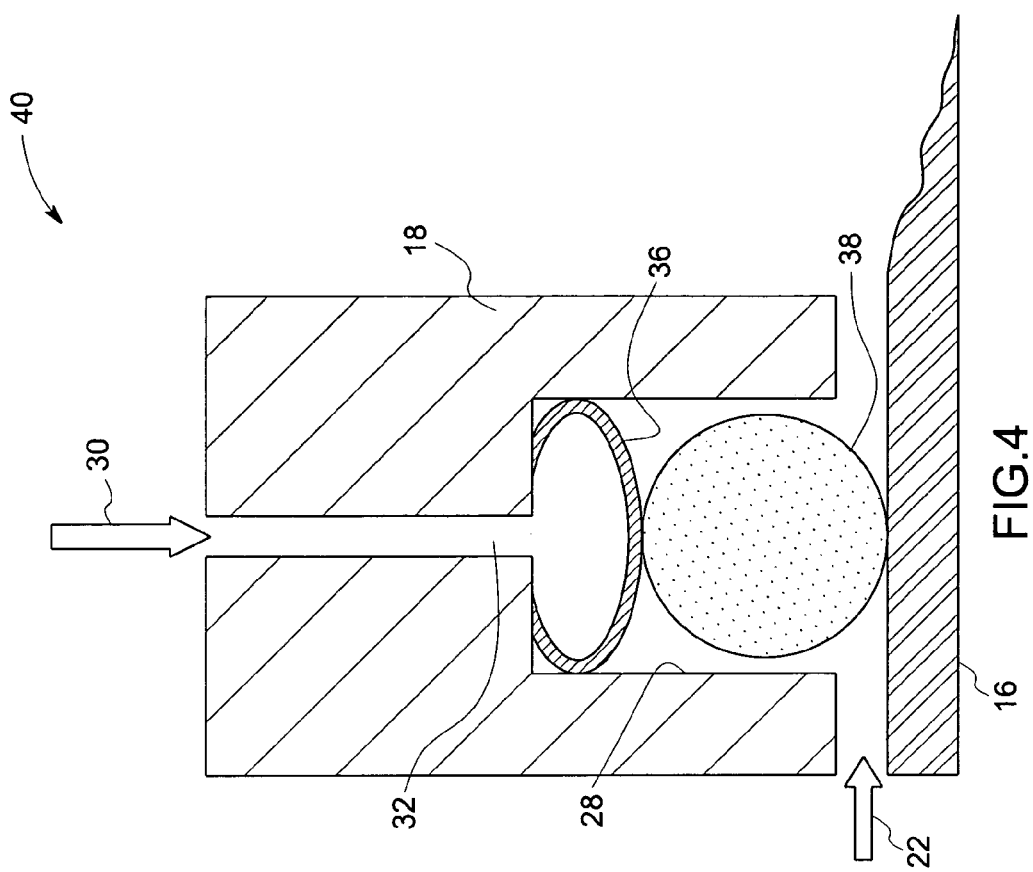
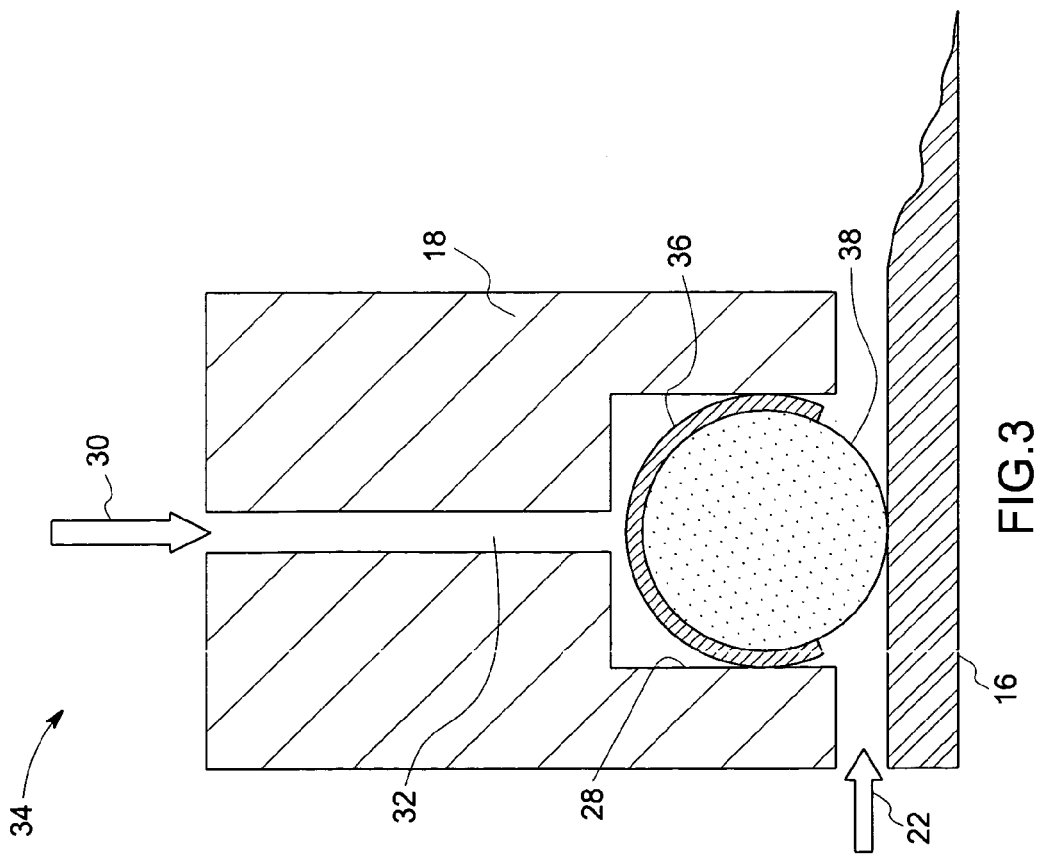
FIG.3
FIG.4

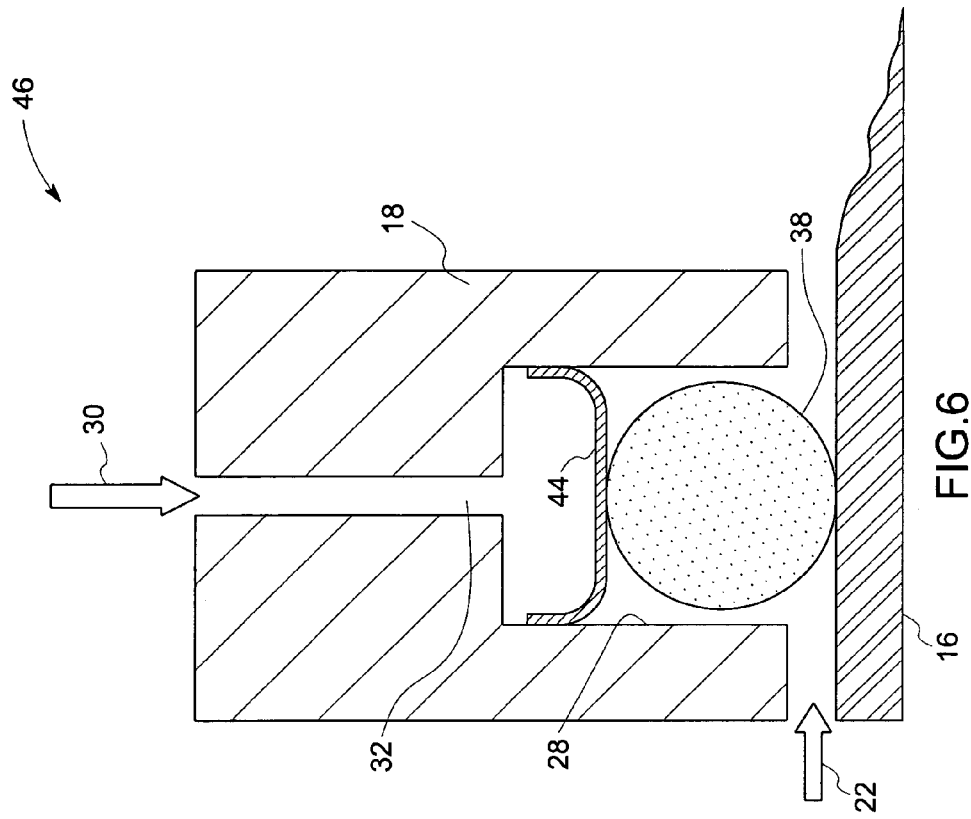
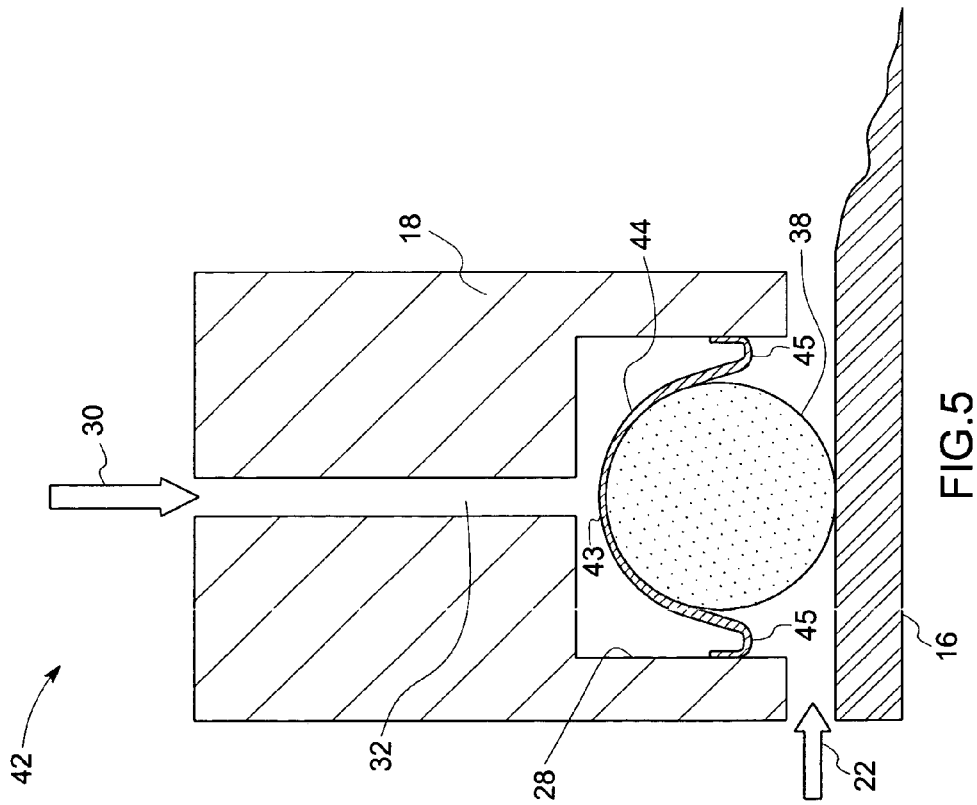

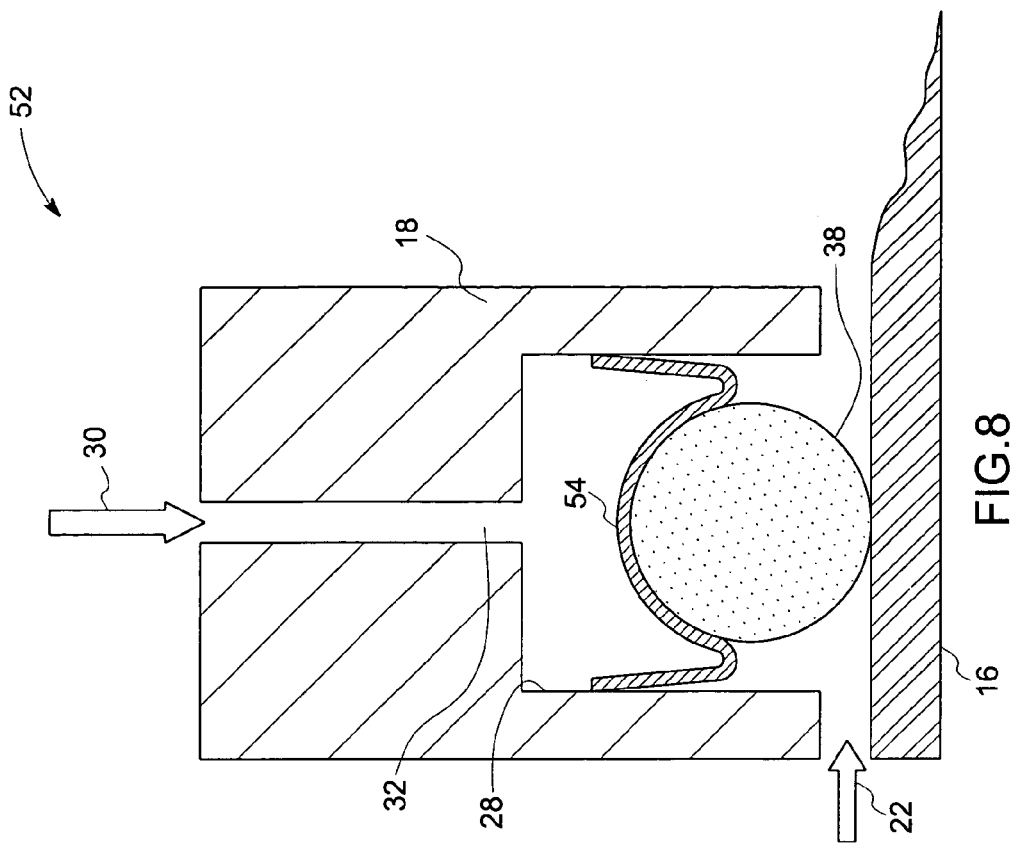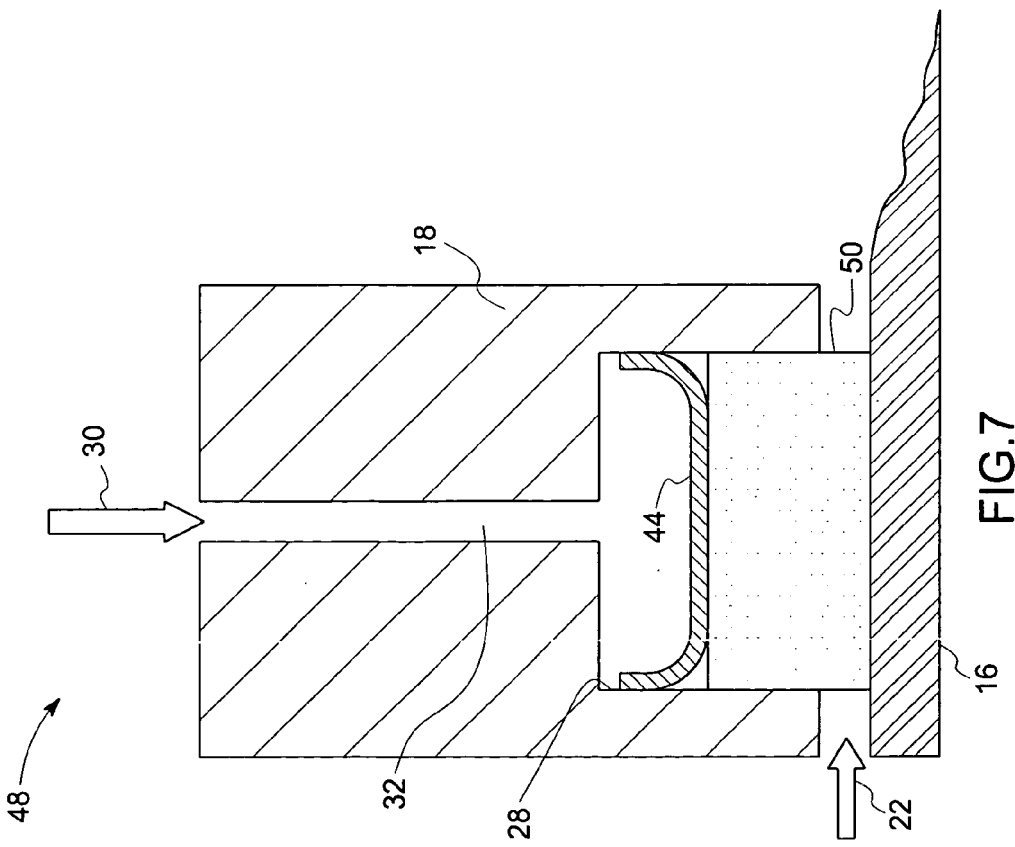

HYBRID SEAL AND SYSTEM AND METHOD INCORPORATING THE SAME

BACKGROUND

The present invention relates generally to methods and structures for sealing and, more particularly, a hybrid seal for sealing adjacent components of a turbine engine.

A number of applications have sealing arrangements between adjacent components. In some applications, seals enable relative motion between the adjacent components, while substantially minimizing fluid leakage between such components. These seals often vary in construction depending upon the environment, the fluids, the pressure ranges, and the temperature ranges.

For example, turbine engines generally have seals between stationary components, such as inner shrouds or outer shrouds. In these turbine engines, the inner shrouds are generally subjected to hot combustion gases, whereas the outer shrouds are subjected to cool purge gases used to cool outer and inner shrouds. It is therefore important to seal the inner and outer shrouds to prevent flows of the hot combustion gases into the outer shrouds and to prevent leakage of the cold purge gases into the inner shrouds. For example, leakage of the hot combustion gases into the outer shrouds could damage or adversely affect life of the turbine engine components.

Traditionally, the inner and outer shrouds are metallic. Therefore, existing seals include metal splines positioned against the inner shroud at locations of hot combustion gases, such that the splines reduce leakage of the hot combustion gases into the outer metallic components. Metal cloth seals also may be employed at such locations. In operation, these metallic seals may accommodate different thermal growths, non-uniformity or transient motion between adjacent components during operation of the turbine engine. Unfortunately, these metallic seals are prone to oxidation or chemical reaction by the hot combustion gases which limits their use as the operating temperatures in the turbine increase.

As a result, metallic sealing structures, such as metal splines and metal cloth seals, are not particularly well suited for higher operating temperatures. For example, higher temperature portions or stages of turbine engines may have temperature ranges approximately 100 to 200 degrees higher than current operating temperatures. Accordingly, higher temperature designs of turbine engines generally have inner shrouds made of materials suitable for these higher temperature ranges. For example, certain higher temperature turbine engines have inner shrouds made of a high temperature resistant ceramic material, such as a Ceramic Matrix Composite (CMC). The components surrounding the inner shroud, such as the outer shroud, are generally metallic in composition. Unfortunately, CMC components are difficult to machine, thereby making it difficult to mechanically capture the metallic seals in the locations of hot combustion gases. High-temperature interface seals, such as rope seals or ceramic block seals, are resistant to chemical reaction with the hot combustion gases, yet these seals do not provide the desired flexibility during periods of dissimilar thermal growth between the inner and outer shrouds.

In such applications as mentioned above, a spring-loaded seal may be employed to facilitate sealing of these CMC components. For example, a spring-loaded seal may have a rope seal with a central core of fibers, a surrounding resilient spring member supporting the core, and at least one layer of braided sheath fibers tightly packed together overlying the spring member. However, such a sealing mechanism, while having an improved resiliency and load bearing capacity, is likely to lose its resiliency when repeatedly loaded at high temperatures.

Therefore, a need exists for a system and method for effectively sealing components in applications, such as turbine engines.

BRIEF DESCRIPTION

A seal having a first seal mechanism adapted for insertion between a first structure and a second structure, wherein the first structure is in communication with a first medium and the second structure is in communication with a second medium. The seal also includes a second seal mechanism, which is pressuringly biasable against the first seal mechanism and against the second structure by the second medium.

In certain embodiments, a system having a first structure in communication with a first medium and a second structure housing a seal assembly between the first and second structures. The seal assembly includes an interface seal disposed against the first structure and a flexible seal pressuringly biased against the second structure and the interface seal by a second medium.

DRAWINGS

These and other features, aspects, and advantages of the present invention will become better understood when the following detailed description is read with reference to the accompanying drawings in which like characters represent like parts throughout the drawings, wherein:

FIG. 1 is a front cross sectional view of a turbine engine having a hybrid seal in accordance with embodiments of the present technique;

FIG. 2 is a partial cross sectional view of the turbine engine of FIG. 1 illustrating a hybrid seal in accordance with embodiments of the present technique;

FIG. 3 is a partial cross sectional view of the turbine engine of FIG. 1 illustrating a hybrid seal employing a C-seal and a rope seal according to one embodiment of the present technique;

FIG. 4 is a partial cross sectional view of the turbine engine of FIG. 1 illustrating a hybrid seal employing a C-seal and a rope seal according to an embodiment of the present technique;

FIG. 5 is a partial cross sectional view of the turbine engine of FIG. 1 illustrating a hybrid seal employing a U-seal and a rope seal according to one embodiment of the present technique;

FIG. 6 is a partial cross sectional view of the turbine engine of FIG. 1 illustrating a hybrid seal employing a U-seal and a rope seal according to an embodiment of the present technique;

FIG. 7 is a partial cross sectional view of the turbine engine of FIG. 1 illustrating a hybrid seal employing a U-seal and a ceramic block seal according to an embodiment of the present technique;

FIG. 8 is a partial cross sectional view of the turbine engine of FIG. 1 illustrating a hybrid seal employing a W-seal and a rope seal according to an embodiment of the present technique;

DETAILED DESCRIPTION

Figure 10:
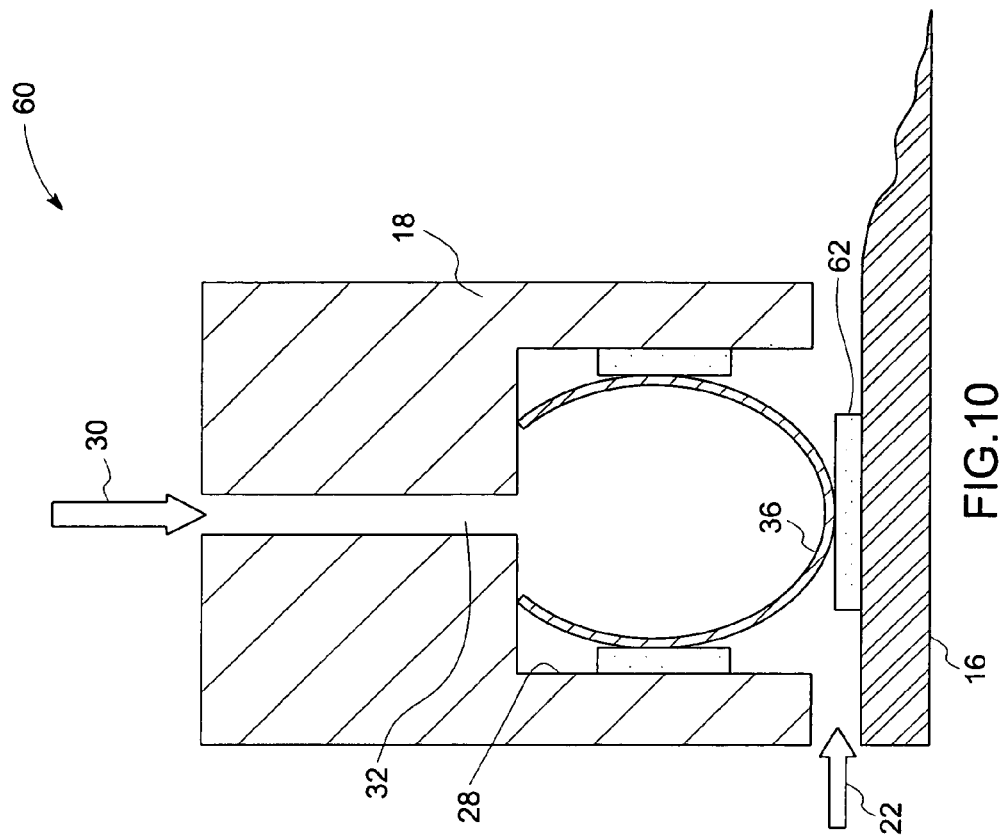
FIG. 10 is a partial cross sectional view of the turbine engine of FIG. 1 illustrating a hybrid seal employing a C-seal and a ceramic coating according to an alternate embodiment of the present technique.

As discussed in detail below, a variety of sealing mechanisms may employed to facilitate sealing between different structures and mediums, such as hot and cold gasses, which are separated by the structures. One such example is a turbine engine, which is subject to hot combustion gases and relatively cool purging air. FIG. 1 is a partial cross-sectional view illustrating a turbine engine 10 having unique sealing mechanisms in accordance with embodiments of the present technique. As illustrated, the turbine engine 10 comprises a plurality of circumferentially spaced buckets or blades 14, which rotate about an axis represented generally by point 12 (i.e., axis is perpendicular to the plane of FIG. 1). At the outer periphery of these blades 14, the turbine engine 10 comprises a shroud-like configuration or inner shroud 16 extending concentrically about the plurality of blades 14 in a ring-shaped configuration. The inner shroud 16 is stationary, and is surrounded by an outer shroud 18 extending concentrically about it. The hot combustion gas 22 generated by combustors (not shown) cause the plurality of blades 14 to rotate about the axis 12. Between the inner and outer shrouds 16 and 18, the turbine engine 10 also has a hybrid seal 20 in accordance with various embodiments described in further detail below. As recognized by one of ordinary skill in the art, hot combustion gases 22 in the turbine engine 10 pass between the rotational blades 14 and the stationary inner shroud 16. Thus, the hybrid seal 20 facilitate sealing between the inner and outer shrouds 16 and 18 and the corresponding internal hot combustion gases 22 and external gases 23 (e.g., cool airflow).

FIG. 2 is a cross sectional view along an axial direction of the turbine engine 10 illustrating an exemplary hybrid seal 20 in accordance with embodiments of the present technique. The illustrated hybrid seal 20 is employed to seal an annular passage of the hot combustion gas 22 between the inner shroud 16 and the surrounding static outer shroud 18.

In the illustrated embodiment, the inner shroud 16 comprises a ceramic material, such as Ceramic Matrix Composite (CMC), which is resistant to chemical reaction by the hot gas 22 even at substantially high temperatures. The illustrated outer shroud 18 comprises a metallic composition.

The illustrated hybrid seal 20 of FIG. 2 comprises an interface seal 24 and a compliant seal or flexible seal 26. The interface seal 24 is engaged against the inner shroud 16. The flexible seal 26 is housed inside the outer shroud 18 and is disposed on the interface seal 24. In operation, a relatively cool purge gas or air 30 flows through a passage 32 in the outer shroud 18 to cool outer metallic components, such as the outer shroud 18. According to certain embodiments of the present technique, the purge gas or air 30 flows through the passage 32 at a relatively high pressure to pressure-load the flexible seal 26, such that the flexible seal 26 is pneumatically biased against the interface seal 24 and also against an inner surface 28 of the outer shroud 18. For example, the purge gas or air 30 may have a pressure range of approximately 700–1200 Kpa. Advantageously, the purge gas or air 30 also facilitates cooling of the flexible seal 26. The flexible seal 26 surface provides a continuous loading surface for the purge air 30, which leads to a uniform distribution of a high pressure even though the turbine engine 10 has a discrete number of purge air passages 32, or purge holes, along the circumference of the outer shroud 18.

The interface seal 24 can include one or more rope seals or block seals. For example, rope seals may comprise a high temperature metal alloy, such as oxide-dispersed strengthened alloy, amongst others, or ceramic fibers such as alumina, alumina-silica or silicon carbide. Other examples of a rope seals include a hybrid rope seal which has multiple layers of the above-mentioned fibers. By further example, block seals may comprise solid ceramic blocks. In operation, the interface seal 24 is exposed to the hot gas 22 and engages the inner shroud 16. Accordingly, the interface seal 24 is desirably oxidation resistant, wear resistant, and resilient. The flexible seal 26 is generally a metallic seal having a C-shaped, U-shaped, or a W-shaped cross-section. The flexible seal 26 generally comprises a high temperature resistant metal alloy, such as nickel-based superalloys, oxide-dispersed strengthened alloys, amongst others.

As recognized by one of ordinary skill in the art, the foregoing hybrid seal 20 may have a variety of embodiments within the scope of the present technique. By further example, FIGS. 3–11 illustrate various alternative embodiments of the hybrid seal 20 illustrated with reference to FIGS. 1 and 2. Referring now to FIG. 3, a partial cross-sectional view of the turbine engine 10 illustrates a sealing arrangement 34 having an interface seal or rope seal 38 and a C-shaped flexible seal or C-seal 36. The illustrated C-seal 36 forms a hollow circular or elliptical structure having a C-shaped cross-section, which extends concave down within and against the inner surface 28 of the outer shroud 18. The C-seal 36 also extends about an upper periphery of the rope seal 38, which in turn engages the top of the inner shroud 16. In operation, the purge gas or air 30 flows through the purge passages 32 to create a high pressure against the C-seal 36. The upper surface of the C-seal 36 provides a continuous loading surface for the purge air 30 to facilitate uniform distribution of purge air 30 pressure over the C-seal 36. Pressure exerted by the purge air 30 is in a direction substantially normal to the outer surface of the C-seal 36. Advantageously, this pressure loading on the C-seal 36 and rope seal 38 biases the rope seal 38 into tighter and more sealed engagement with the inner shroud 16, while also causing the rope seal 38 and the C-seal 36 to expand outwardly into tighter and more sealed engagement against the inner surface 28 of the outer shroud 18.

FIG. 4 illustrates a partial cross-sectional view of the turbine engine 10 illustrating an alternative sealing arrangement 40 in accordance with embodiments of the present technique. As illustrated, the sealing arrangement 40 comprises a C-shaped flexible seal 36 having a convex configuration, which is open upwardly toward the air passage 30. The C-shaped flexible seal 36 engages both the inner surface 28 of the outer shroud 18 and the upper surface of the rope seal 38. Accordingly, as the purge gas or air 30 pressurably engages the C-shaped flexible seal 36, the C-shaped flexible seal 36 expands outwardly against the inner surface 28 of the outer shroud 18 to provide a tighter and more sealed engagement with the outer shroud 18. Simultaneously, the pressure loading against the C-shaped flexible seal 36 forces the rope seal 38 to expand outwardly against the inner shroud 16 to provide a tighter and more sealed engagement with the inner shroud 16. In addition, the pressure loading may cause the rope seal 38 to expand outwardly against the inner surface 28 of the outer shroud 18, thereby providing additional sealing between the inner and outer shroud 16 and 18. Again, the relatively cool temperature of the purge gas or air 30 also facilitates cooling of the C-shaped flexible seal 36.

FIG. 5 illustrates a partial cross-sectional view of the turbine engine 10 illustrating an alternative sealing arrangement 42 in accordance with embodiments of the present technique. As illustrated, the sealing arrangement 42 comprises a U-shaped flexible seal or U-seal 44 and a rope seal 38. As illustrated, the U-seal 44 has a concave middle section 43 and opposite convex outer sections 45. Again, the U-seal 44 has the convex middle section 43 extending over a top periphery of the rope seal 38, while also having the opposite convex outer sections 45 engaged against opposite internal surfaces 28 of the outer shroud 18. In operation, the pressurized purge gas or air 30 forces the U-seal 44 downwardly against the rope seal 38 to facilitate sealing against the inner shroud 16, while also causing the U-seal 44 and the rope seal 38 to expand outwardly toward the inner surface of the outer shroud 18. As with the other rope seals, the downward pressure toward the inner shroud 16 causes the rope seal 38 to mushroom out, such that the rope seal 38 further biases the U-seal 36 toward the inner surface 28 of the outer shroud 18. Accordingly, the sealing arrangement 42 facilitates substantially uniform sealing between the inner and outer shroud 16 and 18.

FIG. 6 illustrates a partial cross-sectional view of the turbine engine 10 illustrating a sealing system 46 in accordance with embodiments of the present technique. In this embodiment, the U-shaped seal 44 has an upwardly open or convex configuration, which faces the purge gas or air passage 30. Again, the pressurized purge gas or air 30 forces the U-seal 44 to expand outwardly toward the inner surface 28 of the outer shroud 18, while simultaneously biasing the rope seal 38 downwardly toward the inner shroud 16.

FIG. 7 illustrates a partial cross-sectional view of the turbine engine 10 illustrating a sealing arrangement 48 in accordance with embodiments of the present technique. In the illustrated embodiment, the sealing arrangement 48 has the U-seal 44 of FIG. 6 with a block seal 50, which is an alternative to the rope seal 38. In operation, the pressurized purge gas or air 30 biases the U-seal 44 outwardly against the inner surface 28 of the outer shroud 18, also forcing the block seal 50 downwardly against the inner shroud 16. In certain embodiments, the block seal 50 may comprise of ceramic, ceramic-matrix composite, ceramic-coated metals or alloys, or high temperature metals (with or without coating).

FIG. 8 illustrates a partial cross-sectional view of the turbine engine 10 illustrating a sealing arrangement 52 in accordance with embodiments of the present technique. As illustrated, the sealing arrangement 52 includes a W-shaped flexible seal or W-seal 54 disposed against a rope seal 38. Similar to the C-seal and U-seal discussed in detail above, the W-seal 54 is biased against the inner surface 28 of the outer shroud 18 by pressure from the purge air 30, thereby providing a uniform loading surface for the purge air 30 against the rope seal 38. In addition, the pressurized purge gas or air 30 forces the W-seal 54 to bias of the rope seal 38 downwardly against the inner shroud 16. As a result, the sealing arrangement 52 is pressure-loaded against both the inner and outer shroud 16 and 18, while also obtaining a cooling flow from the relatively cool temperature of the purge gas or air 30.

Figure 9:
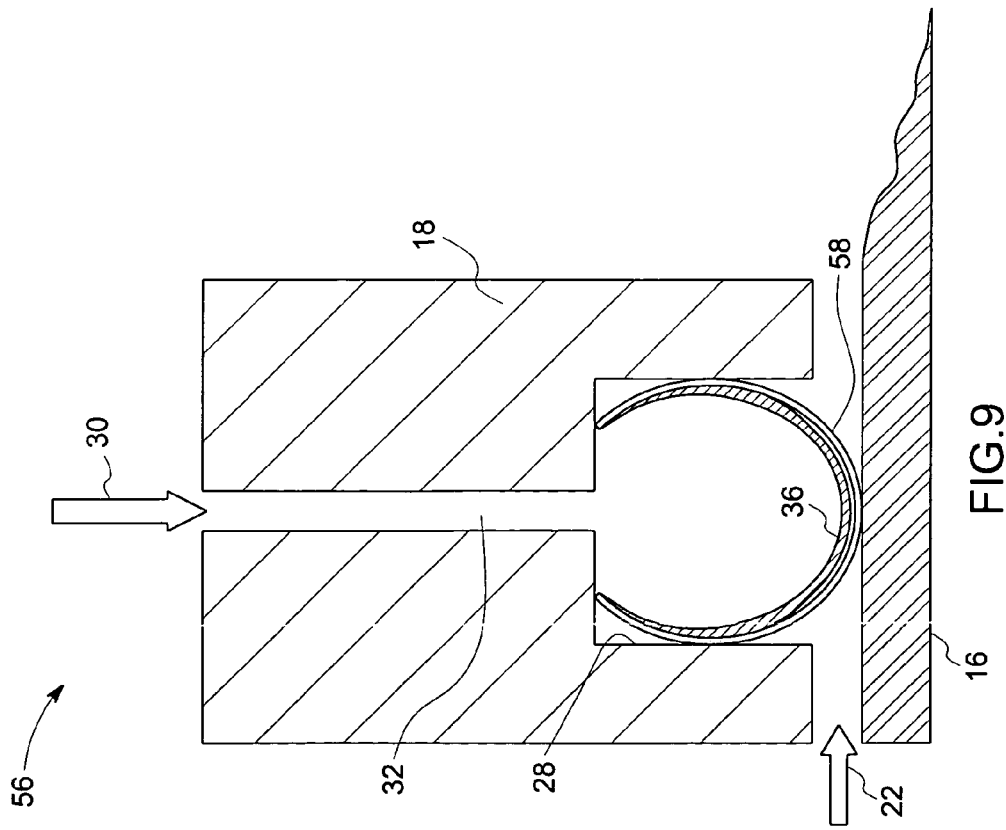
FIG. 9 is a partial cross sectional view of the turbine engine of FIG. 1 illustrating a hybrid seal employing a C-seal and a ceramic coating according to an embodiment of the present technique.

According to a different embodiment, instead of having a rope seal or a block seal, the flexible interface seal (e.g., C-seal, U-seal, or W-seal) may comprise a coating of a ceramic material at one or more locations. For example, the flexible interface seal may comprise a metallic composition while the coating may comprise a ceramic composition. Referring to FIG. 9, a partial cross-sectional view of the turbine engine 10 illustrates a sealing arrangement 56 in accordance with embodiments of the present technique. As illustrated, the sealing arrangement 56 comprises a C-seal 36 and a ceramic coating 58, which is disposed along a convex surface of the C-seal 36 and is engaged against the inner surface 28 of the outer shroud 18. In operation, the pressurized purge gas or air 30 forces the C-seal 36 to expand outwardly against the inner surface 28 of the outer shroud 18, while simultaneously forcing the C-seal 36 to seal downwardly against the inner shroud 16. At these contact points with the inner and outer shrouds 16 and 18, the ceramic coating 58 provides an interface that is more resistant to heat, oxidation, and other adverse affects of the hot combustion gases 22.

In still another embodiment as shown in FIG. 10, a partial cross-sectional view of the turbine engine 10 illustrates a sealing arrangement 60 in accordance with embodiments of the present technique. Here, the sealing arrangement 60 comprises a C-seal 36, which is engaged against a plurality of ceramic-coated surfaces 62 at the inner surface 28 of the outer shroud 18 and the top surface of the inner shroud 16. As illustrated, these ceramic-coated surfaces 62 provide an interface between the C-seal 36 and the inner and outer shrouds 16 and 18. Accordingly, these ceramic-coated surfaces 62 provide an interface that is more resistant to heat, oxidation, and other adverse affects of the hot combustion gases 22.

Figure 11:
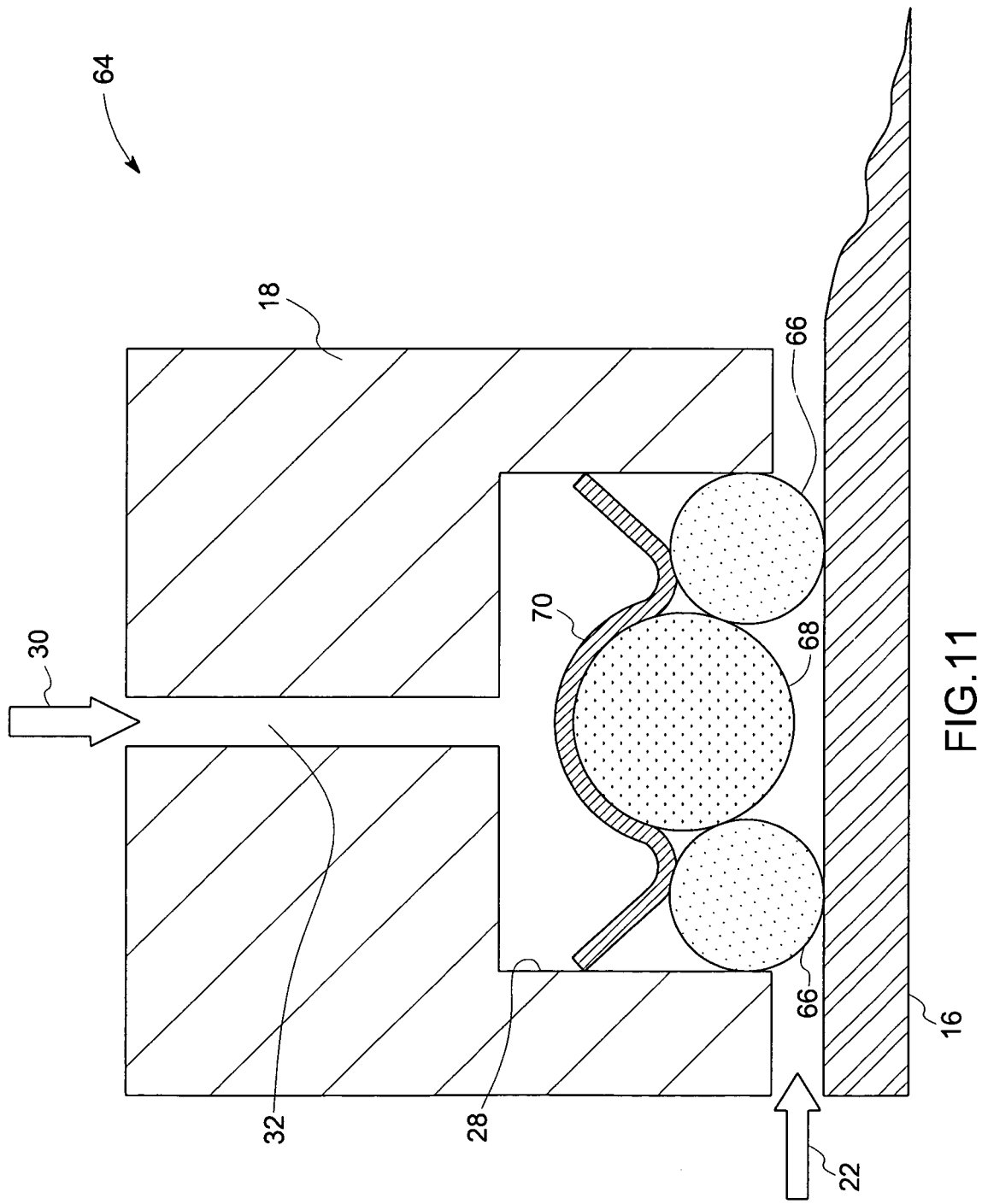
FIG. 11 is a partial cross sectional view of the turbine engine of FIG. 1 illustrating a hybrid seal employing a plurality of rope seal members according to one embodiment of the present technique.

FIG. 11 illustrates a partial cross-sectional view of the turbine engine 10 illustrating a sealing arrangement 64 in accordance with embodiments of the present technique. In the illustrated embodiment, the sealing arrangement 64 includes a plurality of interface seals or rope seal members, such as outer rope seals 66 and central rope seal 68. The sealing arrangement 64 also has a baseline seal or flexible W-seal 70, which engages all three of the rope seals 66 and 68. In operation, the pressurized purge gas or air 30 forces the flexible seal 70 to expand outwardly against the inner surfaces 28 of the outer shroud 18, while also biasing each of the rope seals 66 and 68 the downwardly toward the inner shroud 16. In this embodiment, the downward pressure against the rope seals 66 and 68 also forces the larger central rope seal 68 to fill the space between the outer rope seals 66, thereby biasing the outer rope seals 66 outwardly toward the inner surface 28 of the outer shroud 18. The sealing arrangement 64 also provides sealing redundancy if one or more rope seal members 66 and 68 fails on account of excessive chemical or mechanical degradation.

In certain embodiments, the rope seals 66 and 68 of FIG. 11 may comprise fiber ropes of a ceramic material or a high temperature resistant metal. The smaller diameter rope seals 66 also may be coupled to the larger diameter rope seal 68 to provide a network of sealing fibers. The flexible seal 70 comprises a compliant material, for example, a high temperature resistant metal. The compliance of the flexible seal 70 can be varied by prescribing specific radii for the bend regions and specific angles for straight ligaments that comprise the W-shape.

Figure 12:
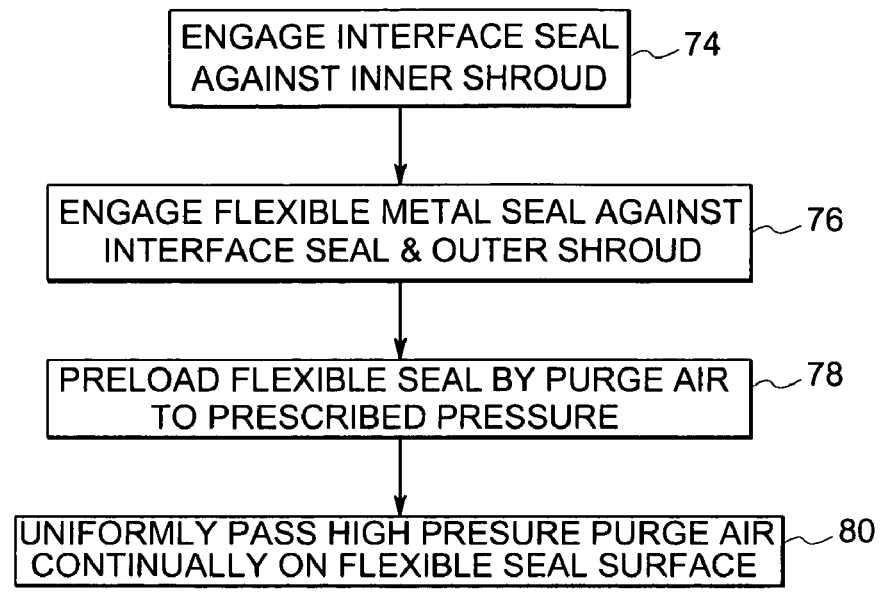
FIG. 12 is a flowchart illustrating a method of operating a hybrid seal according to embodiments of the present technique.

FIG. 12 illustrates a process 72 of using the proposed hybrid seal in a turbine engine in accordance with embodiments of the present technique. As illustrated, the process 72 comprises engaging an interface seal against an inner shroud of the turbine engine (block 74). This step 74 may include engaging one or more rope seals or block seals, such as solid ceramic blocks, against the inner shroud 16 of the turbine engine 10 illustrated in FIG. 1. As discussed above, the inner shroud 16 may be subject to a hot gas 22. At step 76, a flexible metallic seal is engaged against the interface seal and housed in an outer shroud of the turbine. As discussed above, the outer shroud 18 may be in communication with a purge air 30 relatively colder than the hot gas 22. Step 76 may comprise engaging a metallic C-seal, U-seal, or a W-seal in a desired orientation against the interface seal, as described in embodiments discussed earlier. At step 78, the flexible seal is preloaded by the purge air to a desired pressure as prescribed by various flow parameters of the hot gas operating on the inner shroud. At step 80, the purge air is continuously passed through a purge hole at a pressure uniformly onto the outer surface of the flexible seal. Thus, the pressure biases the flexible seal against the interface seal and against a lateral inner surface of the outer shroud, as discussed in detail above. Advantageously, this pressure-loaded engagement between the interface seal, the flexible metal seal, and the inner and outer shrouds provides a uniform and reliable seal between these different components and gases.

Figure 13:
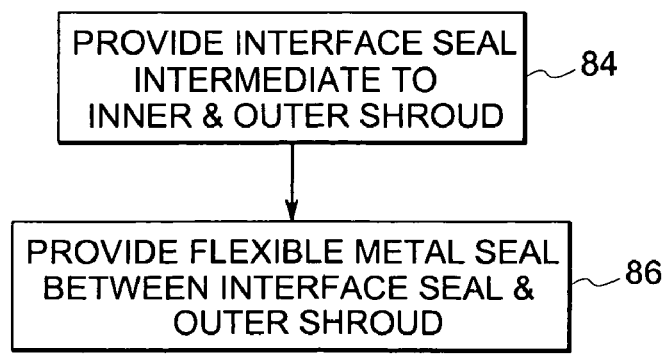
FIG. 13 is a flowchart illustrating a method of manufacturing a hybrid seal according to embodiments of the present technique.

FIG. 13 illustrates an exemplary process 82 of manufacturing a hybrid seal for a turbine engine in accordance with embodiments of the present technique. The process 82 comprises providing an interface seal intermediate to an inner shroud and an outer shroud of a turbine engine (block 84). As discussed in detail above, the inner shroud is adapted to be in communication with a hot gas, while the outer shroud is adapted to be in communication with a relatively colder purge air. Step 84 includes providing a rope seal, a solid ceramic block, or a ceramic coating as described in various embodiments. At step 86, the process 82 provides a flexible seal, which is disposed on the interface seal and also against a lateral inner surface of the outer shroud. Step 86 may include providing a metallic seal having a C-shaped, a U-shaped or a W-shaped cross-section. Moreover, the flexible seal may be composed of a high temperature resistant metal.

The aforementioned embodiments effectively incorporate the advantages of compliant metallic seals, and high temperature and oxidation resistant rope seals and ceramic blocks. The embodiments described employ a purge air to preload and bias the seal, eliminating the need for mechanical capture of the seal. Further, pneumatic biasing of the flexible seal against the lateral inner surface of the outer shroud provides a desired sealing against leakage of the cold purge air into the hot gas path. The techniques illustrated also provide for a uniform distribution of preloading and biasing pressures on the surface of the flexible seal.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
a first structure in communication with a first medium; and
a second structure housing a seal assembly between the first and second structures, the seal assembly comprising:
an interface seal disposed against the first structure; and
a flexible seal pressuringly biased against the second structure and the interface seal by a second medium; wherein the flexible seal comprises a metal.
2. The system of claim 1, wherein the first structure is an inner shroud and the second structure is an outer shroud.
3. The system of claim 1, wherein the first medium is hot gas and the second medium is a cooling gas.
4. The system of claim 1, wherein the system comprises a gas turbine engine.
5. The system of claim 1, wherein the interface seal comprises a ceramic material.
6. The system of claim 1, wherein the interface seal comprises a rope seal.
7. The system of claim 1, wherein the interface seal comprises a block seal.
8. The system of claim 1, wherein the interface seal comprises a plurality of seal members.
9. The system of claim 1, wherein the flexible seal comprises a C-shaped structure.
10. The system of claim 1, wherein the flexible seal comprises a U-shaped structure.
11. The system of claim 1, wherein the flexible seal comprises a W-shaped structure.
12. The system of claim 1, wherein the seal assembly is preloaded by the second medium.
13. A seal, comprising:
a first seal mechanism adapted for insertion between a first structure and a second structure, wherein the first structure is in communication with a first medium and the second structure is in communication with a second medium; and
a second seal mechanism, which is pressuringly biasable against the first seal mechanism and against the second structure by the second medium; wherein the second seal mechanism comprises a C-shaped structure, or a U-shaped structure, or a W-shaped structure, or any combination thereof.
14. The seal of claim 13, wherein the first structure is an inner shroud and the second structure is an outer shroud.
15. The seal of claim 13, the first medium is a hot gas and the second medium is a purge gas relatively colder than the hot gas.
16. The seal of claim 13, wherein the first seal mechanism comprises a ceramic material.
17. The seal of claim 13, wherein the first seal mechanism comprises a rope seal structure.
18. The seal of claim 13, wherein the first seal mechanism comprises a block seal structure.
19. The seal of claim 13, wherein the first seal mechanism comprises a plurality of seal members.
20. The seal of claim 13, wherein the second seal mechanism comprises a metal.
21. The seal of claim 13, wherein the second seal mechanism comprises the C-shaped structure.
22. The seal of claim 13, wherein the second seal mechanism comprises the U-shaped structure.
23. The seal of claim 13, wherein the second seal mechanism comprises the W-shaped structure.
24. A system, comprising:
means for sealingly interfacing a first structure adjacent a second structure, wherein the first structure is in communication with a first medium and the second structure is in communication with a second medium; and means for pressurably and sealingly interfacing both the second structure and the means for sealingly interfacing the first structure to provide a pressure-loaded seal with both the first structure and the second structure, wherein the second medium is relatively cooler than the first medium.

25. The system of claim 24, wherein the first structure is an inner shroud and the second structure is an outer shroud.

26. The system of claim 24, wherein the first medium is hot gas and the second medium is a purge gas relatively cooler than the hot gas.

27. The system of claim 24, wherein the system comprises a gas turbine engine.

28. A method, comprising:
engaging a first seal against a first structure adjacent a second structure, wherein the first structure is in communication with a first medium and the second structure is in communication with a second medium;
pressuringly biasing a second seal against the first seal and against the second structure with pressure of the second medium; and
preloading the second seal by the second medium.

29. The method of claim 28, wherein engaging the first seal comprises interfacing a rope seal against the first structure.

30. The method of claim 28, wherein engaging the first seal comprises interfacing a block seal against the first structure.

31. The method of claim 28, wherein engaging the first seal comprises interfacing a plurality of seal members against the first structure.

32. The method of claim 28, wherein pressuringly biasing the second seal comprises pressuring a C-seal flexibly against the first seal and against the second structure.

33. The method of claim 28, wherein pressuringly biasing the second seal comprises pressuring a U-seal flexibly against the first seal and against the second structure.

34. The method of claim 28, wherein pressuringly biasing the second seal comprises pressuring a W-seal flexibly against the first seal and against the second structure.

35. A method, comprising:
providing a first seal engagable with a first structure adjacent a second structure, the first structure being adapted to communicate with a first medium and the second structure being adapted to communicate with a second medium separate from the first medium; and
providing a second seal pressurably biasable by the second medium against the first seal and against the second structure, wherein the first seal comprises metal, ceramic, or a combination thereof.

36. The method of claim 35, wherein providing the first seal comprises providing a rope seal.

37. The method of claim 35, wherein providing the first seal comprises providing a block seal.

38. The method of claim 35, wherein providing the first seal comprises providing a plurality of seal members.

39. The method of claim 35, wherein providing the second seal comprises providing a C-shaped seal.

40. The method of claim 35, wherein providing the second seal comprises providing a U-shaped seal.

41. The method of claim 35, wherein providing the second seal comprises providing a W-shaped seal.

42. The method of claim 35, wherein the second seal comprises a metal.

43. A system for pneumatically sealing a gas path in an engine, comprising:
a rope seal adapted for insertion between an inner shroud and an outer shroud of the engine, wherein the inner shroud is in communication with a hot gas and the outer shroud is in communication with a purge gas relatively colder than the hot gas; and
a C-shaped seal, which is pressuringly biasable against the rope seal and against the outer shroud by the purge gas.

44. The system of claim 43, wherein a concave surface of the C-shaped seal is disposed against the rope seal.

45. The system of claim 44, wherein a convex surface of the C-shaped seal is disposed against the rope seal.

46. A system for pneumatically sealing a gas path in an engine, comprising:
a rope seal adapted for insertion between an inner shroud and an outer shroud of the engine, wherein the inner shroud is in communication with a hot gas and the outer shroud is in communication with a purge gas relatively colder than the hot gas; and
a U-shaped seal, which is pressuringly biasable against the rope seal and against the outer shroud by the purge gas.

47. A system for pneumatically sealing a gas path in an engine, comprising:
a ceramic block seal adapted for insertion between an inner shroud and an outer shroud of the engine, wherein the inner shroud is in communication with a hot gas and the outer shroud is in communication with a purge gas relatively colder than the hot gas; and
a U-shaped seal, which is pressuringly biasable against the ceramic block seal and against the outer shroud by the purge gas.

48. A system for pneumatically sealing a gas path in an engine, comprising:
a rope seal adapted for insertion between an inner shroud and an outer shroud of the engine, wherein the inner shroud is in communication with a hot gas and the outer shroud is in communication with a purge gas relatively colder than the hot gas; and
a W-shaped seal, which is pressuringly biasable against the rope seal and against the outer shroud by the purge gas.

* * * * *